(12) United States Patent
Warren et al.

(10) Patent No.: US 12,116,224 B2
(45) Date of Patent: Oct. 15, 2024

(54) BULK MATERIAL UNLOADING SYSTEMS AND METHODS

(71) Applicant: Halliburton Energy Services, Inc., Houston, TX (US)

(72) Inventors: Wesley John Warren, Duncan, OK (US); Chad A. Fisher, Duncan, OK (US); Austin Carl Schaffner, Duncan, OK (US); Cameron Michael Kramer, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 346 days.

(21) Appl. No.: 17/543,080

(22) Filed: Dec. 6, 2021

(65) Prior Publication Data

US 2023/0174326 A1 Jun. 8, 2023

(51) Int. Cl.
*B65G 65/23* (2006.01)
*B01F 35/21* (2022.01)
*B01F 35/221* (2022.01)
*B01F 35/71* (2022.01)
*B65G 69/20* (2006.01)
*B01F 101/49* (2022.01)

(52) U.S. Cl.
CPC .......... *B65G 65/23* (2013.01); *B01F 35/2111* (2022.01); *B01F 35/2211* (2022.01); *B01F 35/71705* (2022.01); *B01F 35/7173* (2022.01); *B01F 35/71775* (2022.01); *B65G 69/20* (2013.01); *B01F 2101/49* (2022.01)

(58) Field of Classification Search
CPC ........ B65G 65/23; B65G 65/32; B65G 65/36; B65G 65/4881; B65G 65/42; B65G 65/46; B65G 69/20; B65G 69/02; B65G 69/26; B01F 35/7173; B01F 35/2211; B01F 35/71705; B01F 35/71775; B01F 35/2111; B01F 1/49; B01F 2101/49; B65F 1/122; B65F 1/1452; B65F 3/04; B65F 3/041; B65F 3/048
See application file for complete search history.

(56) References Cited

U.S. PATENT DOCUMENTS

| | | | | |
|---|---|---|---|---|
| 2,949,199 | A * | 8/1960 | Jones | B60P 1/50 294/68.27 |
| 4,779,186 | A * | 10/1988 | Handke | G05D 11/137 366/156.1 |
| 4,951,990 | A * | 8/1990 | Hollan | B66F 9/19 414/785 |
| 6,224,315 | B1 * | 5/2001 | Van Arkel | B65G 51/01 414/420 |

(Continued)

*Primary Examiner* — Glenn F Myers
(74) *Attorney, Agent, or Firm* — Conley Rose, P.C.; Rodney B. Carroll

(57) ABSTRACT

The disclosure provides a bulk material unloading system and method. The system includes a bulk material container containing a bulk material and an unloading device. The unloading device is configured to engage the bulk material container and at least partially invert the bulk material container. The method includes engaging a bulk material container containing a bulk material with an unloading device and emptying the bulk material container. Emptying the bulk material into the hopper includes lifting the bulk material container using the unloading device and rotating the bulk material container using the unloading device.

31 Claims, 8 Drawing Sheets

(56) References Cited

U.S. PATENT DOCUMENTS

| | | | |
|---|---|---|---|
| 9,340,353 | B2 | 5/2016 | Oren et al. |
| 10,076,733 | B2 | 9/2018 | Morris et al. |
| 10,518,229 | B2 | 12/2019 | Morris et al. |
| 10,526,136 | B2 | 1/2020 | Hawkins et al. |
| 10,815,050 | B2 | 10/2020 | Hess et al. |
| 10,919,693 | B2 | 2/2021 | Lucas et al. |
| 10,982,505 | B2 | 4/2021 | Oehler et al. |
| 10,989,018 | B2 | 4/2021 | Oehler et al. |
| 10,994,954 | B2 | 5/2021 | Allegretti et al. |
| 2007/0172339 | A1* | 7/2007 | La Forest ............ B65G 69/182 414/404 |
| 2008/0017645 | A1* | 1/2008 | Garagiola ............... B65F 1/122 220/345.4 |
| 2013/0039728 | A1* | 2/2013 | Price ...................... B65F 3/048 414/408 |
| 2016/0039433 | A1* | 2/2016 | Oren ........................ B61D 3/20 410/68 |
| 2016/0144586 | A1* | 5/2016 | Schwelling ............ B65G 65/23 414/419 |
| 2016/0325931 | A1* | 11/2016 | Christenson .......... B65F 1/0006 |
| 2017/0297836 | A1* | 10/2017 | Burns ..................... B65G 67/46 |
| 2017/0327326 | A1 | 11/2017 | Lucas et al. |
| 2018/0065814 | A1* | 3/2018 | Eiden, III .............. B65D 88/32 |
| 2018/0072491 | A1* | 3/2018 | D'Agostino ............... B65B 7/16 |
| 2019/0144216 | A1 | 5/2019 | Dawson et al. |
| 2020/0223346 | A1 | 7/2020 | Welch et al. |
| 2020/0339345 | A1* | 10/2020 | Lewis ..................... B65F 3/048 |
| 2021/0062632 | A1* | 3/2021 | Lambert ............ E21B 43/2607 |
| 2021/0178345 | A1 | 6/2021 | Arceneaux et al. |

\* cited by examiner

BULK MATERIAL UNLOADING SYSTEMS AND METHODS

TECHNICAL FIELD OF THE INVENTION

The present disclosure relates generally to bulk material containers and systems for unloading the bulk materials contained in the bulk material containers, and more particularly, to bulk material containers and systems to provide bulk material for use in well operations.

BACKGROUND

Bulk material such as proppant, gel particulate, dry-gel particulate, aggregate, feed, and other solid materials are used in a wide variety of contexts include, but not limited to, drilling and completion of oil and gas wells, concrete mixing applications, agriculture, and others. For drilling and completion of oil and gas wells, a bulk material such as proppant is typically mined at a remote location, then transported to a facility where it is rinsed and dried, and then transported to a wellsite where it is typically combined with water and chemical additives before being used in wellbore operations. Depending on the length of the wellbore, certain operations may require millions of pounds of bulk material, and because downtime on well means lost profits, the millions of pounds of bulk material must be ready when needed. Thus, in order to cut down on transportation costs and drying costs and to ensure that a sufficient amount of bulk material is ready at the wellsite when needed, operators have begun to resort to mining in the same oil field and using the wet proppant produced therefrom. The mined proppant is considered "wet proppant" when the moisture in the proppant is high enough to deter or inhibit the proppant's flowability, which becomes evident by the proppant's increased angle of repose compared to a dry sample of proppant. Typically, proppant is considered "wet" when the proppant contains from about 0.2% to about 15% residual liquid contents by weight. By removing the need for transporting wet proppant long distances and the need for drying the mined proppant, the use of wet proppant has the additional benefit of lowering the environmental impact of its use. However, there are obstacles operators must deal with when using wet proppant produced from the oilfield instead of dry bulk materials.

When handling dry bulk materials, typically the container is filled with dry bulk material through an opening in the top of the container, the filled container is transported to a location, and the bulk material is dumped from the container through a valve or gate disposed on a bottom of the container. However, these dry bulk material containers for handling free flowing dry bulk material are not conducive to use with wet bulk material such as wet proppant from an oil field. Dry bulk material containers typically have a taper at the bottom that funnels the dry bulk material to a valve or door that allows for emptying the container from the bottom. Wet proppant, however, clumps and does not flow as easily as dry material. Thus, a container for wet proppant that is able to be emptied completely is desired.

The clumping and lesser ability of wet proppant to flow also create issues when trying to move and combine the wet proppant with other materials once it has been emptied from a bulk material container. For example, when using wet proppant for wellbore operations, it is typically combined with water and chemical additives before use. In order for the combined wellbore operation fluids to be properly made into a homogenous mixture, clumps of wet proppant must be broken up and the wet proppant must be added to the mixture evenly. Thus, a bulk material unloading system that is able to evenly add loose wet proppant to a blender is desired.

Figure 1A:
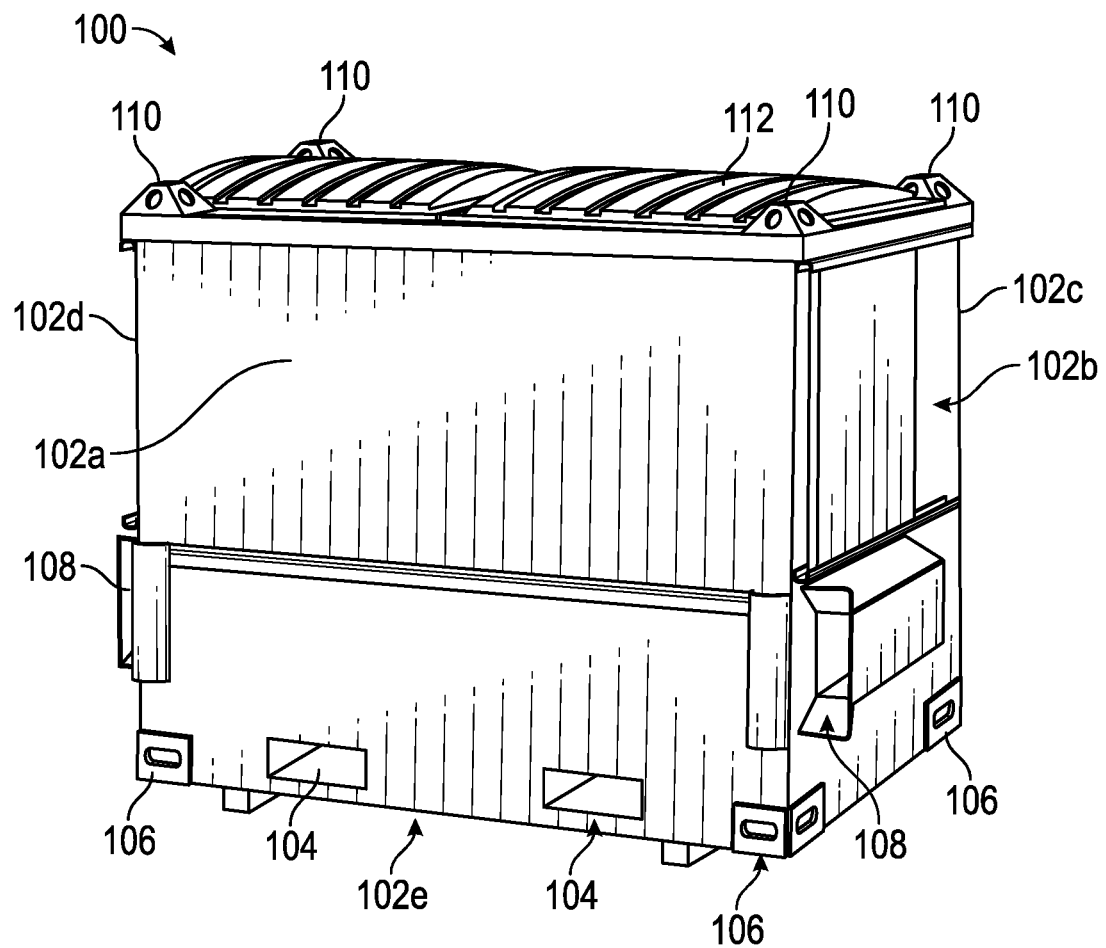
FIGS. 1A and 1B are a diagram of an illustrative bulk material container according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

A bulk material container and bulk material unloading system for fully unloading wet proppant is desired. As discussed above, the term "wet proppant," as used herein, refers to a wetted well stimulation proppant having a liquid content sufficiently high to deter or inhibit the flowability of the proppant. The bulk material container may include a body having a cavity that leads to an opening, and one or more engagement elements. The one or more engagement elements may include engagement elements for coupling the bulk material container to a transportation device (e.g., a forklift, a crane, an ISO container handler, or a telehandler), engagement elements for coupling the bulk material container to a transportation vehicle (e.g., a truck, a trailer, or a train car) or another bulk material container, and engagement elements for coupling the bulk material container to a container unloading device. In one or more embodiments, the bulk material container may additionally include locating elements for aligning and coupling bulk material containers that are stacked on top of each other. Thus, in one or more embodiments, the bulk material containers carrying wet proppant may be transported to a wellsite, coupled to a container unloading device, and unloaded directly or indirectly into a blender for mixing with fluids so that those mixed fluids may be used in wellbore operations.

Further, the bulk material unloading system may include a bulk material container containing the wet proppant, an unloading device, a hopper, a delivery device, and a blender. In one or more embodiments, the unloading device may engage the bulk material container and unload the wet proppant into the hopper. Further, the hopper may receive the wet proppant from the bulk material container and dispense the bulk material into the delivery system. Additionally, the delivery system may move the bulk material into the blender.

Illustrative embodiments of the present invention are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

The terms "couple" or "couples," as used herein, are intended to mean either an indirect or direct connection. Thus, by way of example, if a first device couples to a second device, that connection may be through a direct physical connection or through an indirect connection by way of straps, chains, or other elements of the container.

Figure 1B:
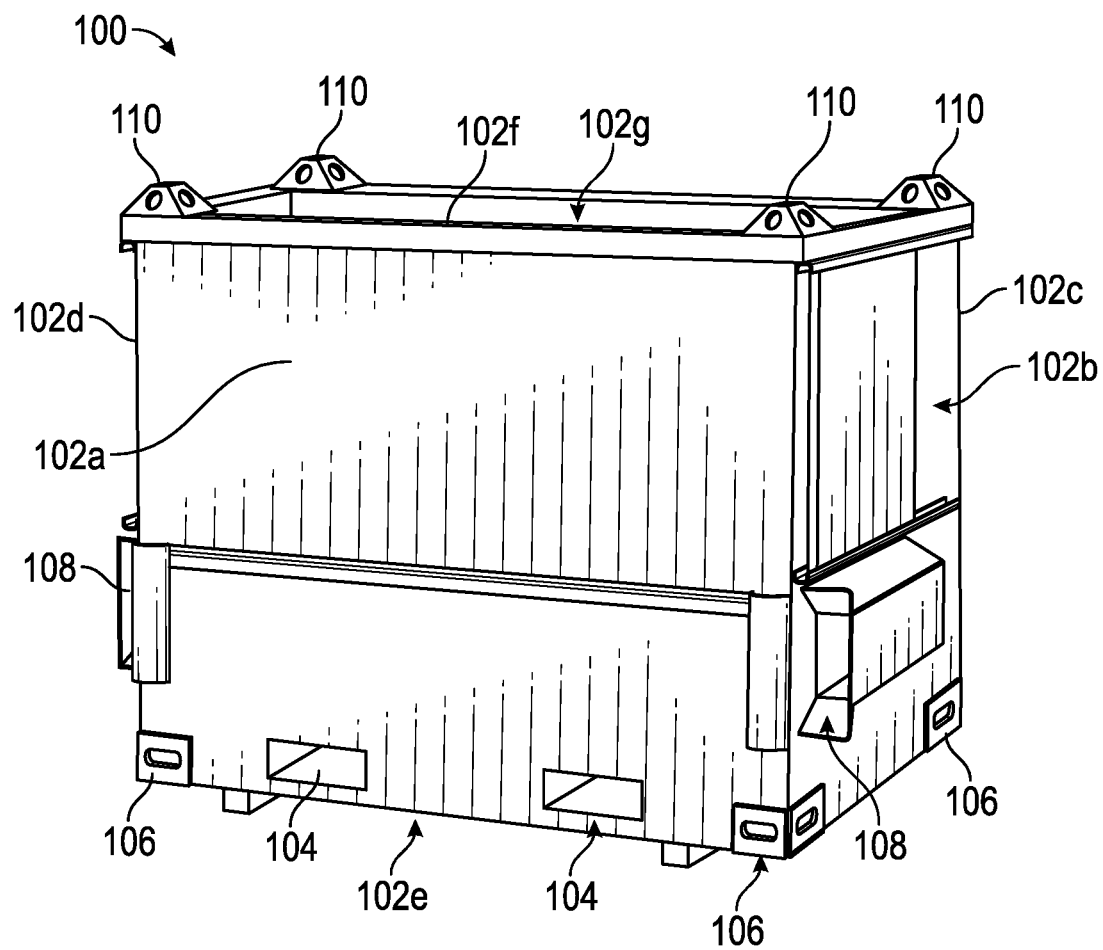

Referring now to FIGS. 1A and 1B, a bulk material container 100 according to one or more aspects of the present disclosure is illustrated. In one or more embodiments, the bulk material container 100 may include a body 102 containing four side walls 102a, 102b, 102c, and 102d and a bottom 102e. The body 102 may include a cavity 102g within the four side walls 102a-d and above the bottom 102e that leads to an opening 102f at a top of the body 102, which is spatially opposite of the bottom 102e. While the body 102 is depicted as including a plurality of side walls 102a-d, in one or more embodiments, the body 102 may include a single cylindrical or cone shaped side wall. Further, in one or more embodiments, the bulk material container may include one or more first engagement elements 104. The first engagement elements 104 may be formed so as to receive prongs of a transportation device (not shown) such that the transportation device may lift and move the bulk material container 100 from one place to another. Furthermore, in one or more embodiments, the bulk material container 100 may include one or more second engagement elements 106. The second engagement elements 106 may be formed so that the bulk material container 100 may be coupled to a transportation vehicle or another bulk material container (not shown). Additionally, in one or more embodiments, the bulk material container 100 may include one or more third engagement elements 108. The third engagement elements 108 may be formed so as to receive prongs of an unloading device (not shown) such that the unloading device may lift the bulk material container 100 to empty the wet proppant from the bulk material container 100 into a hopper or blending device to be mixed with a fluid to create a mixture for use in wellbore operations. While in one or more embodiments the unloading device may engage the third engagement elements 108, in other embodiments, the unloading device may engage the first engagement elements 104 or the second engagement elements 106 to lift the bulk material container to empty the wet proppant from the bulk material container 100.

In one or more embodiments, the side walls 102a-d may be substantially straight, and the sides of the cavity 102g within the body 102 of the bulk material container 100 may also be substantially straight. Thus, in one or more embodiments, a cross-sectional area may be substantially the same at a bottom of the cavity 102g as it is at the opening 102f of the body 102 of the bulk material container 100, which is the top of the cavity 102g. Therefore, when the bulk material container is turned upside down, gravity may be sufficient to fully empty a wet proppant from the bulk material container. In other embodiments, the cavity 102g may have a slight taper from the opening 102f of the body 102 at the top of the cavity 102g to the bottom of the cavity 102g such that the cross-sectional area at the bottom of the cavity 102g is slightly smaller than the cross-sectional area at the opening 102f.

Further, in one or more embodiments, the first engagement elements 104 may be slots disposed through a bottom 102e of the body 102 within which one or more prongs of a transportation device and/or an unloading device may be disposed. In other embodiments, instead of forming slots through the bottom of the body, brackets may be coupled to a bottom of the bottom 102e of the body 102 such that slots are formed within which prongs of the transportation device and/or the unloading device may be disposed. Furthermore, while two slots are shown, in one or more embodiments, a single slot may be formed or a single bracket may be coupled to the body such that the one or more prongs of the transportation device and/or the unloading device may be disposed within the single slot. Additionally, in one or more embodiments, the first engagement elements 104 may provide structural support to the bottom 102e of the body 102.

Additionally, in one or more embodiments, one of the second engagement elements 106 may be disposed in each of the four bottom corners of the body 102. The second engagement elements 106 may include slots through which a chain, rope, or strap may be disposed which allows for the bulk material container 100 to be coupled to the transportation vehicle or another bulk material container. In other embodiments, the second engagement elements 106 may be male or female portions of a locking mechanism, such as an ISO container lock or other twist lock, such that the bulk material container may be aligned with the corresponding female or male portions of the locking mechanism and locked to the transportation vehicle or another bulk material container. Further, in one or more embodiments, the second engagement elements 106 may be configured to be coupled to an unloading device such that the unloading device may empty the bulk material container 100.

Furthermore, in one or more embodiments, the third engagement elements 108 may be brackets coupled to two of the side walls (e.g., 102b and 102d) that are opposite from each other. The brackets may be coupled to the side walls such that slots are formed within which prongs of the transportation device and/or prongs of the unloading device may be disposed. In other embodiments, instead of coupling the brackets to the side walls (e.g., 102b and 102d) of the bulk material container 100, the brackets may be coupled to a bottom 102e of the body 102 of the bulk material container adjacent to the first engagement elements 104. In further embodiments, instead of coupling brackets to the side walls or bottom of the bulk material container, slots may be disposed through two of the side walls (e.g., 102b and 102d) that are opposite from each other or through the bottom 102e of the body 102 of the bulk material container 102 within which one or more prongs of the unloading device may be disposed.

Additionally, in one or more embodiments, the bulk material container 100 may include one or more locating elements 110. One of the locating elements 110 may be disposed in each of the four corners of the body 102 proximate to the top of side walls 102b-d. The locating elements 110 may include a protrusion that is configured to engage a slot formed in the second engagement elements 106 so as to align bulk material containers that are stacked on top of each other. Additionally, in one or more embodiments, the locating elements may be configured such that a crane may couple to the locating elements 110 and use the locating elements 110 to pick up the bulk material container 100 to transport it. In other embodiments, the locating elements may be female or male portions of a locking mechanism, such as an ISO container lock or other twist lock, such that the bulk material container 100 may be aligned with and locked to the corresponding male or female portions of the locking mechanism which are the second engagement elements of another bulk material container.

Further, in one or more embodiments, the bulk material container 100 may include a lid 112. The lid 112 may be coupled to one or more of the side walls 102a-d and may cover the opening 102f. Furthermore, the lid 112 may be removable such that the opening 102f may be fully exposed or may be hingedly coupled to one of the side walls 102a-d such that the lid 112 may be opened about the hinged connection to fully expose the opening 102f. Additionally, in one or more embodiments, a locking mechanism may be coupled between one or more of the side walls 102a-d and the lid 112 such that the lid may be maintained covering the opening 102f when the bulk material container 100 is in transit or being stored.

Furthermore, in one or more embodiments, the bulk material container 100 may include a valve (not shown). The valve may be coupled to the bottom 102e or to one of the side walls 102a-d adjacent to the bottom 102e of the body 102. The valve may be closed in the default position and may be opened to allow for the release of any built up fluid in the wet proppant that has settled to the bottom.

Figure 2:
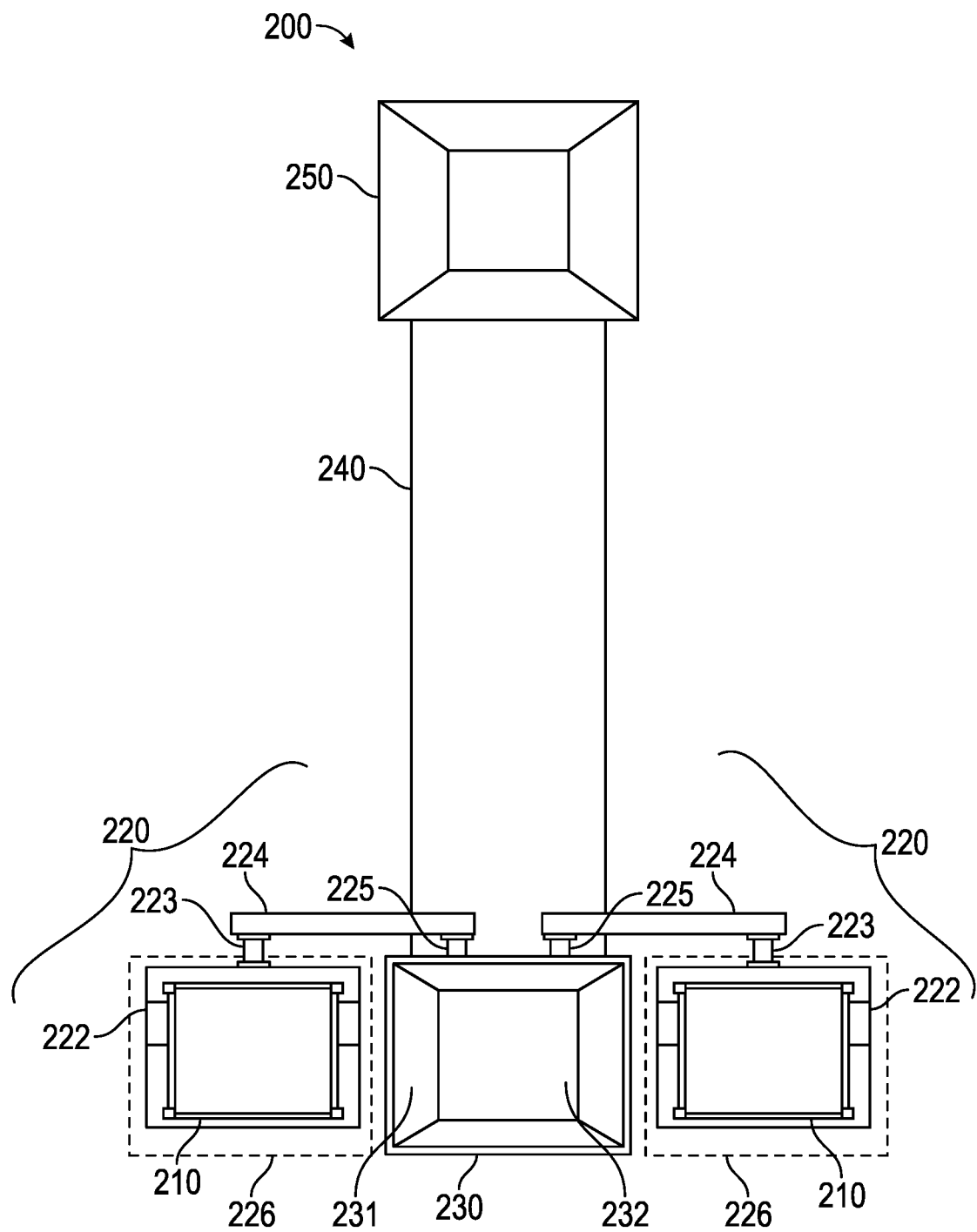
FIG. 2 is a diagram of an illustrative bulk material unloading system according to one or more aspects of the present disclosure.

Referring now to FIG. 2, a bulk material unloading system 200 according to one or more aspects of the present disclosure is illustrated. In one or more embodiments, the bulk material unloading system 200 may include at least one bulk material container 210, at least one unloading device 220, a hopper 230, a delivery device 240, and a blender 250. In one or more embodiments, the unloading device 220 may include engagement elements 222, a first connector 223, a pivot arm 224, a second connector 225, and a base (not expressly shown). The engagement elements 222 may be coupled to the pivot arm 224 by way of the first connector 223, and the pivot arm may be coupled to the base by way of the second connector 225. While in one or more embodiments, the pivot arm 224 is coupled to the base, in other embodiments, the pivot arm may be coupled to the hopper 230.

In one or more embodiments, the first connector 223 and the second connector 225 of the unloading device 220 may be pivotable such that the engagement elements 222 may rotate relative to the pivot arm 224 and the pivot arm 224 may rotate relative to the base, respectively. In one or more embodiments, the pivot arm 224 may rotate about the second connector between a first position and a second position, where in the first position, the unloading device 220 is configured to receive and engage with the bulk material container 210, and in the second position, the bulk material container is disposed above the hopper 230. As depicted in FIG. 2, the pivot arm 224 may rotate between a first position in which the pivot arm 224 is substantially parallel to the ground and a second position in which the pivot arm 224 is substantially perpendicular to the ground. However, in other embodiments, the pivot arm 224 may rotate between a first position in which the pivot arm 224 is substantially perpendicular to the ground and a second position in which the pivot arm 224 is substantially parallel to the ground. Further, in other embodiments, the pivot arm 224 may rotate between a first position in which the pivot arm 224 is substantially parallel to the ground on a first side of the base and a second position in which the pivot arm 224 is substantially parallel to the ground on a second side of the base. Furthermore, in one or more embodiments, the pivot arm 224 may be rotated to any position between the first position and the second position such that the unloading device 220 may control the unloading of the bulk material container 210 into the hopper 230.

Furthermore, in one or more embodiments, the engagement elements 222 of the unloading device 220 may be a set of forks or prongs which are configured to engage the bulk material container 210. In one or more embodiments, the engagement elements 222 may rotate about the first connector between a first position and a second position. In one or more embodiments, when the engagement elements 222 are in the first position, the bulk material container 210 is generally upright with its opening facing upwards, and when the engagement elements 222 are in the second position, the bulk material container 210 is at least partially inverted. Thus, in one or more embodiments, the engagement elements 222 may rotate between a first position in which the engagement elements 222 are substantially parallel to the pivot arm 224 and a second position in which the engagement elements 222 are substantially perpendicular to the pivot arm 224. In other embodiments, the engagement elements 222 may rotate between a first position in which the engagement elements 222 are substantially perpendicular to the pivot arm 224 and a second position in which the engagement elements 222 are substantially parallel to the pivot arm 224. Further, in one or more embodiments, the engagement elements 222 may be rotated to any position between the first position and the second position such that the unloading device 220 may control the unloading of the bulk material container 210 into the hopper 230. While in one or more embodiments, the engagement elements 222 are pivotably coupled to the pivot arm 224, in other embodiments, the first connector 223 may be rotationally fixed to the pivot arm 224 such that the engagement elements 222 do not rotate relative to the pivot arm 224. Further, while the engagement elements 222 of the unloading device 220 are depicted as a set of forks or prongs, in one or more embodiments, the engagement elements 222 may be a locking mechanism, such as an ISO container lock or other twist lock, and may be configured to engage a corresponding locking mechanism of the bulk material container 210.

Additionally, in one or more embodiments, the unloading device 220 may include a vibration device (not shown). In one or more embodiments, the vibration device may be coupled to one of the engagement elements 222, the pivot arm 224, or the base, and may be configured to vibrate the bulk material container 210 to jar the bulk material container 210 when the bulk material container 210 is being unloaded into the hopper 230. Jarring the bulk material container 210 using the vibration device may aid in completely emptying the bulk material container 210 into the hopper 230. While in one or more embodiments, the bulk material container 210 may be jarred by a vibration device, in other embodiments, the unloading device may be configured to jar the bulk material container by rotating the pivot arm 224 back and forth by a short distance while the pivot arm is at or near the second position.

Further, in one or more embodiments, the unloading device may include a sensor configured to measure the weight of the bulk material container 210 and its contents. In one or more embodiments, the sensor may be coupled to one or more receiving stations 226. The receiving stations may be formed on a ground of the wellsite adjacent to the engagement elements 222 of the unloading device 220 when the engagement elements 222 are disposed in the first position. In other embodiments, the sensor may be coupled to one of the engagement elements 222 or the pivot arm 224 instead of being coupled to one or more receiving stations 226. The sensor may be a load cell, a strain gauge, or a pressure sensor in one or more embodiments. Measuring the weight of the bulk material container 210 and its contents may allow an operator to track the amount of bulk material remaining in the bulk material container 210 while unloading the bulk material into the hopper 230 and/or may allow the operator to track the total amount of proppant consumed in wellbore operations.

As discussed above, the unloading device 220 may be configured to engage the bulk material container 210 such that the unloading device 220 may lift and rotate the bulk material container 210 to unload the bulk material contained in the bulk material container 210 into the hopper 230. In one or more embodiments, the engagement elements 222 of the unloading device 220 are configured to engage the bulk material container 210. In one or more embodiments, bulk material container 210 may be the bulk material container as discussed above with regard to FIGS. 1A and 1B, and the engagement elements 222 of the unloading device 220 may be configured to engage one of the first engagement elements 104, the second engagement elements 106, or the third engagement elements 108 of the bulk material container 100. However, the bulk material container may be any container having engagement elements within which the engagement elements 222 of the unloading device 220 may be disposed or to which the engagement elements 222 of the unloading device may be coupled such that the unloading device may lift and rotate the bulk material container.

Further, in one or more embodiments, the hopper 230 may be configured to hold the bulk material received from the bulk material container 210 which is configured to be unloaded by the unloading device 220. In one or more embodiments, the hopper 230 may be large enough to hold at least the full contents of one bulk material container 210. However, in one or more embodiments, the hopper 230 may be configured to hold the full contents of two or more bulk material containers. Further, in one or more embodiments, the hopper 230 may also be configured to dispense the bulk material onto or into the delivery device 240. In one or more embodiments, the hopper may include a cone or pyramidal shaped container 231 coupled to a release mechanism 232. The release mechanism 232, in one or more embodiments, may be a valve or gate which may release the bulk material from the hopper 230 at a variable rate depending on the amount the valve or gate are opened or closed during operation. The variable rate may be changed by an operator during operation of the system in order to provide the amounts of the bulk material necessary for mixing to the delivery device 240.

Furthermore, in one or more embodiments, the hopper 230 may include an additive dispensing device (not shown). The additive dispensing device may be configured to inject liquid or dry additives into the bulk material when the bulk material is disposed within the hopper 230 before the bulk material is provided by the hopper to the delivery device 240.

Additionally, in one or more embodiments, the hopper 230 may include one or more sensors (not shown). The sensors may be configured to measure one or more parameters of the bulk material disposed within the hopper 230, such as the amount of bulk material contained in the hopper 230 by volume or weight, the size of the particles, the amount of liquid contained in the bulk material, and/or the amount of additives contained in the bulk material. In one or more embodiments, the sensor for measuring the amount of bulk material contained in the hopper 230 may include a load cell, a strain gauge, a pressure sensor, a radar level sensor, or a sonar level sensor.

Further, in one or more embodiments, the hopper 230 may include a vibration device (not shown). In one or more embodiments, the vibration device may be coupled to the cone or pyramidal shaped container 231, the release mechanism 232, or both, and may be configured to vibrate the hopper to jar any stuck or clumped bulk material loose when the hopper 230 is dispensing the bulk material onto or into the delivery device 240. Jarring the hopper 230 using the vibration device may aid in completely emptying the hopper 230 onto or into the delivery device 240.

Furthermore, in one or more embodiments, the delivery device 240 is configured to meter the bulk materials at a controlled rate to the blender 250. The delivery device 240 may be a conveyor belt, a gravity chute, or an auger. The delivery device 240 may include a bulk material rate measurement system (not expressly shown) for measuring the rate at which the bulk material is being dispensed by the delivery device 240 to the blender 250 and a control system (not expressly shown) for controlling the rate at which the bulk material is dispensed by the delivery device 240 to the blender 250. The bulk material rate measurement system may include a load cell, a pressure sensor, or a sensor for measuring the speed of a belt or auger. The conveyor belt system, the auger system, and the gravity chute system are discussed further below with respect to FIGS. 3-5.

Additionally, in one or more embodiments, the blender 250 may be a device configured to combine and mix a slurry of water, bulk material, dry chemicals, and/or liquid chemicals for use in wellbore operations. In one or more embodiments, the blender 250 may include one or more sensors for measuring the amount of bulk material being provided to the blender 250 by the delivery device 240.

Figure 3:
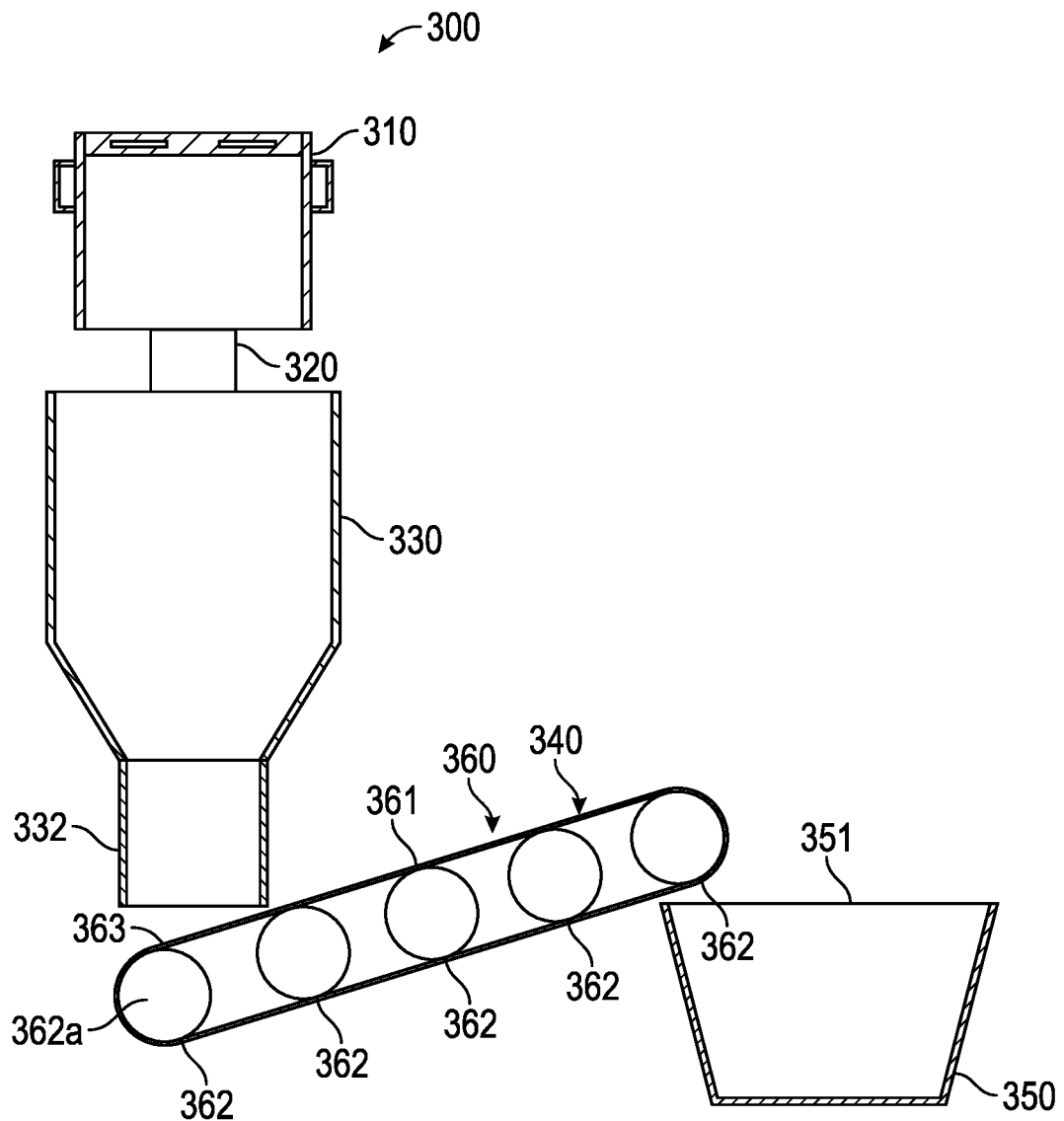
FIG. 3 is a cross-sectional view of an illustrative delivery device of a material unloading system according to one or more embodiments of the present disclosure.

Referring now to FIG. 3, a cross-sectional view of a delivery device 340 of a material unloading system 300 according to one or more embodiments of the present disclosure is illustrated. The material unloading system 300 may be substantially similar to the material unloading system described above with regard to FIG. 2. The material unloading system 300 may include a bulk material container 310, an unloading device 320, a hopper 330, a delivery device 340, and a blender 350. Further, in one or more embodiments, the delivery device 340 may be a conveyor belt system 360. The conveyor belt system 360 may include a belt 361 and a plurality of rollers 362. The belt 361 may be disposed around the plurality of rollers 362 such that the belt 361 is rotated along the plurality of rollers 362 by one of the plurality of rollers which acts as the driving roller 362a. Further, in one or more embodiments, a load cell or pressure sensor 363 may be disposed beneath the belt 361 of the conveyor belt system such that the load cell or pressure sensor 363 may measure the amount of bulk material being provided to the delivery device 340 by the hopper 330. Furthermore, the delivery device 340 may include a sensor (not expressly shown) for measuring the speed of the belt. Additionally, where the delivery device 340 is a conveyor belt system 360, the hopper 330 may be disposed such that the release mechanism 332 of the hopper 330 is disposed above, below, or on level with an inlet 351 of the blender 350.

Figure 4:
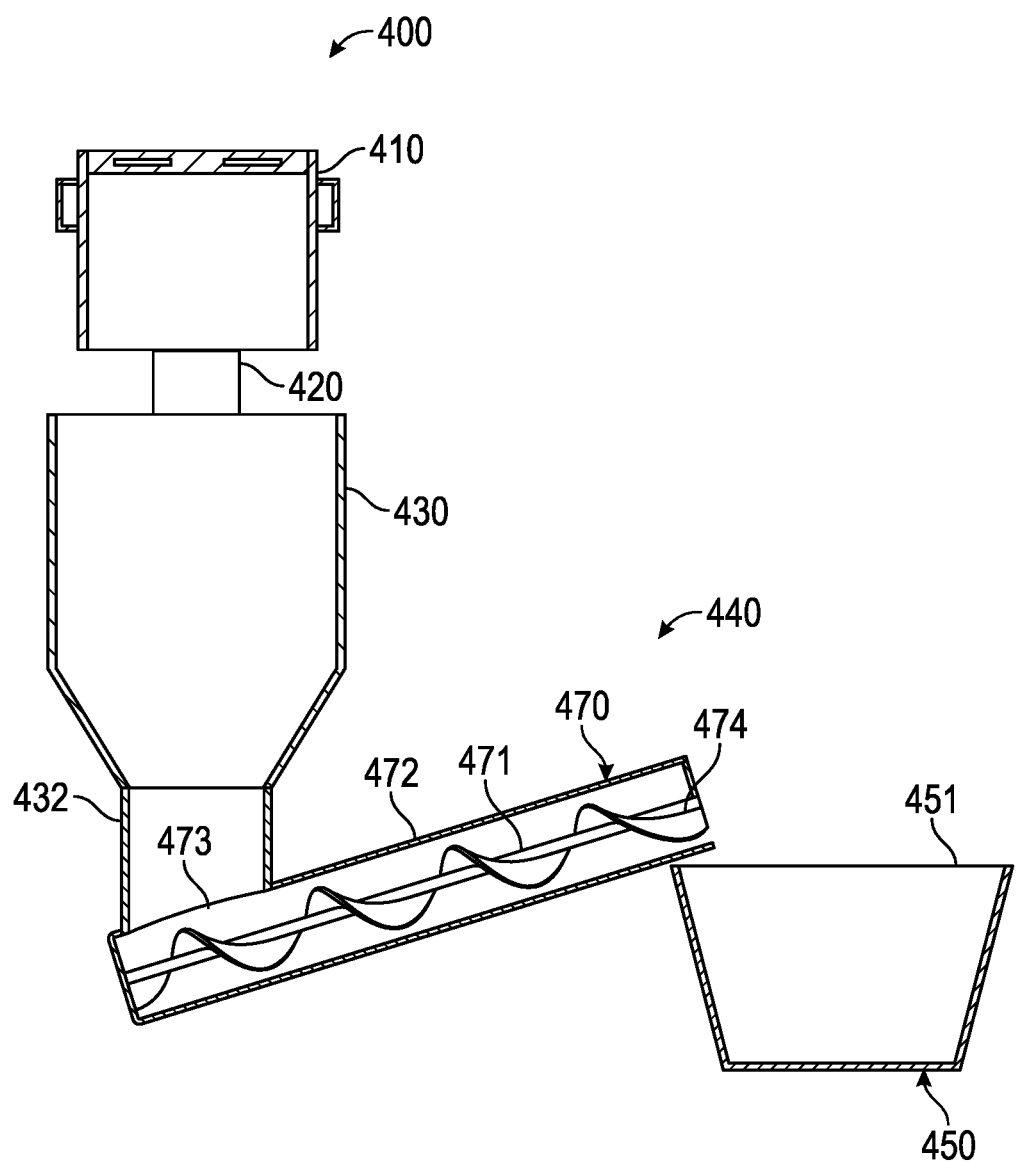
FIG. 4 is a cross-sectional view of an illustrative delivery device of a material unloading system according to one or more embodiments of the present disclosure.

Referring now to FIG. 4, a cross-sectional view of a delivery device 440 of a material unloading system 400 according to one or more embodiments of the present disclosure is illustrated. The material unloading system 400 may be substantially similar to the material unloading system described above with regard to FIG. 2. The material unloading system 400 may include a bulk material container 410, an unloading device 420, a hopper 430, a delivery device 440, and a blender 450. Further, in one or more embodiments, the delivery device 440 may be an auger system 470. The auger system 470 may include a helical screw blade 471 and a cylinder 472. The cylinder 472 may include an inlet 473 and an outlet 474. The release mechanism 432 of the hopper 430 may be configured to unload bulk material into the auger system 470 through the inlet 473 of the cylinder 472, and the auger system 470 may be configured to unload bulk material into the blender 450 through the outlet 474 of the cylinder 472. In one or more embodiments, the release mechanism 432 may be coupled to the inlet 473 of the cylinder 472. Further, the helical screw blade 471 may be disposed within the cylinder 472 and configured to rotate such that bulk material is carried by the rotating helical screw 471 from the inlet 473 to the outlet 474 which is disposed adjacent to an inlet 451 of the blender 450. Furthermore, the delivery device 440 may include a sensor for measuring the speed of the helical screw of the auger. Additionally, where the delivery device 440 is an auger system 470, the hopper 430 may be disposed such that the release mechanism 432 of the hopper 430 is disposed below or on level with an inlet 451 of the blender 450.

Figure 5:
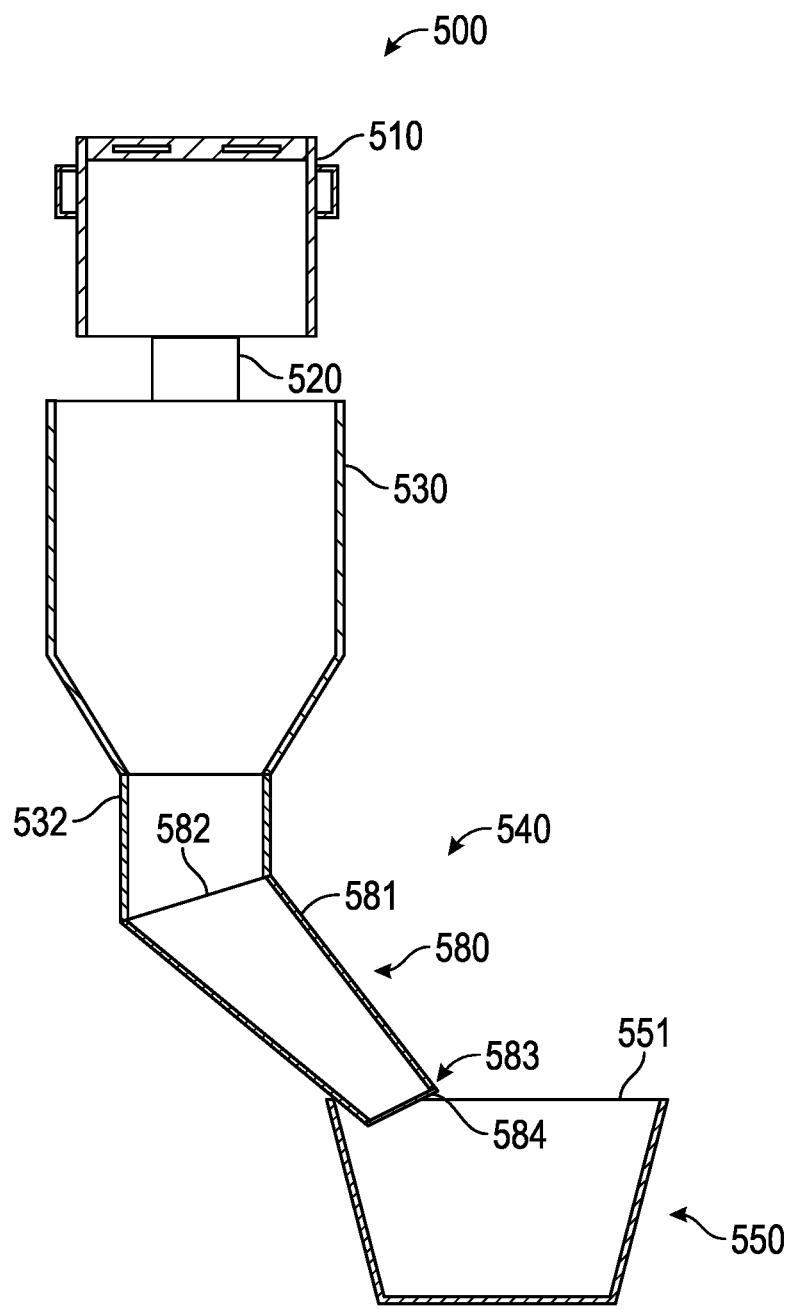
FIG. 5 is a cross-sectional view of an illustrative delivery device of a material unloading system according to one or more embodiments of the present disclosure.

Referring now to FIG. 5, a cross-sectional view of a delivery device 540 of a material unloading system 500 according to one or more embodiments of the present disclosure is illustrated. The material unloading system 500 may be substantially similar to the material unloading system described above with regard to FIG. 2. The material unloading system 500 may include a bulk material container 510, an unloading device 520, a hopper 530, a delivery device 540, and a blender 550. Further, in one or more embodiments, the delivery device 540 may be a gravity chute system 580. The gravity chute system 580 may include a chute 581 having an inlet 582 and an outlet 583. In one or more embodiments, the inlet 582 may be coupled to the release mechanism 532 of the hopper 530 such that when the bulk material is unloaded from the hopper 530, it enters the gravity chute system 580 through the inlet 582. Further, in one or more embodiments, the outlet 583 may be disposed adjacent to an inlet 551 of the blender 550 such that when bulk material exits the gravity chute system 580, the bulk material enters the blender 550 under the force of gravity. Thus, in one or more embodiments, the rate at which the bulk material is provided to the blender may be controlled by at least partially opening or closing the release mechanism 532. Additionally, the gravity chute system 580 may further include a valve or gate 584 coupled to the outlet 583 such that the rate at which the bulk material is provided to the blender may be controlled by at least partially opening or closing the valve or gate 584. Furthermore, in one or more embodiments, the gravity chute system 580 may include a load cell (not expressly shown) coupled to the chute 581 such that it measures the weight of the bulk material passing from the hopper 530 to the blender 550 so as to determine the rate at which the bulk material is being provided to the blender 550. Because the gravity chute system 580 relies on gravity, in one or more embodiments, where the delivery device 540 is a gravity chute system 580, the hopper 530 is disposed such that the release mechanism 532 of the hopper 530 is disposed above an inlet 551 of the blender 550. Further, the gravity chute system 580 may include a vibration device (not shown) in order to vibrate the gravity chute system 580 to increase the gravity flow rate of the bulk material through the chute 581.

Figure 6:
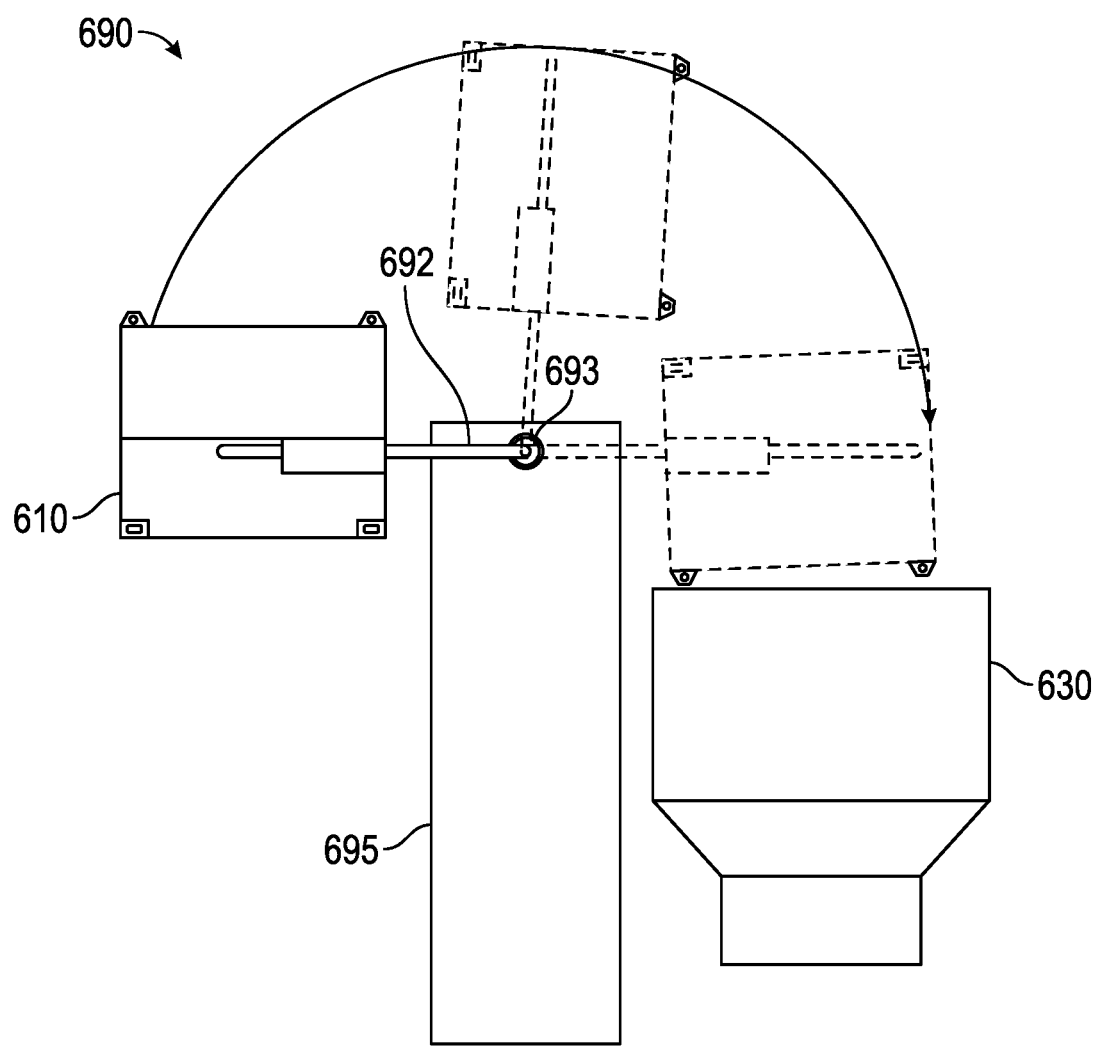
FIG. 6 is a diagram of an illustrative unloading device for bulk material containers according to one or more embodiments of the present disclosure.

Referring now to FIG. 6, an unloading device 690 for bulk material containers 610 according to one or more embodiments of the present disclosure is illustrated. In one or more embodiments, the unloading device 690 may include one or more engagement elements 692, an engagement element connector 693, and a base 695. The engagement elements 692 may be coupled to the base 695 by way of the engagement element connector 693. In one or more embodiments, the engagement element connector 693 may be pivotable such that the engagement elements 692 may rotate relative to the base 695. In one or more embodiments, the engagement elements 692 may rotate about the engagement element connector 693 between a first position and a second position, where in the first position, the unloading device 690 is configured to receive and engage with the bulk material container 610, and in the second position, the bulk material container 610 is disposed above a hopper 630. As depicted in FIG. 6, in one or more embodiments, engagement elements 692 may rotate between a first position in which the engagement elements 692 are substantially parallel to the ground on a first side of the base 695 that is distal to a hopper 630 and a second position in which the engagement elements 692 are substantially parallel to the ground on a second side of the base 695 that is adjacent to the hopper 630. Further, in one or more embodiments, the engagement elements 692 may be rotated to any position between the first position and the second position such that the unloading device 690 may control the unloading of a bulk material container 610 into the hopper 630.

Furthermore, in one or more embodiments, the engagement elements 692 of the unloading device 690 may be a set of forks or prongs which are configured to engage the bulk material container 610. The unloading device 690 may be configured to engage the bulk material container 610 such that the unloading device 690 may lift and rotate the bulk material container 690 over the hopper 630 to unload the bulk material contained in the bulk material container 610 into the hopper 630. In one or more embodiments, bulk material container 610 may be the bulk material container as discussed above with regard to FIGS. 1A and 1B, and the engagement elements 692 of the unloading device 690 may be configured to engage the first engagement elements 104, the second engagement elements 106, or the third engagement elements 108 of the bulk material container 100. However, the bulk material container may be any container having engagement elements within which the engagement elements 692 of the unloading device 690 may be disposed such that the unloading device may lift and at least partially invert the bulk material container. Additionally, while the engagement elements 692 of the unloading device 690 are depicted as a set of forks or prongs, in one or more embodiments, the engagement elements 692 may be a locking mechanism, such as an ISO container lock or other twist lock, and may be configured to engage a corresponding locking mechanism of the bulk material container 610.

Additionally, in one or more embodiments, the unloading device 690 may include a vibration device (not shown). In one or more embodiments, the vibration device may be coupled to either the engagement elements 692 or the base 695, and may be configured to vibrate the unloading device 690 to jar the bulk material container 610 when the bulk material container 610 is being unloaded into the hopper 630. Jarring the bulk material container 610 using the vibration device may aid in completely emptying the bulk material container 610 into the hopper 630.

Further, in one or more embodiments, the unloading device may include a sensor configured to measure the weight of the bulk material container 610 and its contents when the engagement elements 692 engage the bulk material container 610. In one or more embodiments, the sensor may be a load cell, a strain gauge, or a pressure sensor, and in one or more embodiments, the sensor may be coupled to one of the engagement elements 692.

Figure 7:
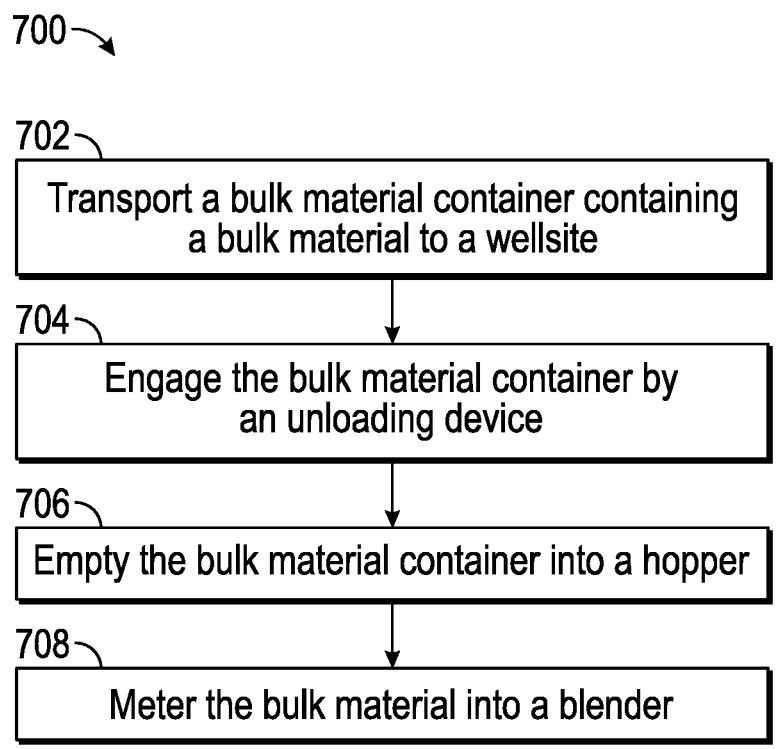
FIG. 7 is a flow diagram of an illustrative method for unloading bulk material according to one or more embodiments of the present disclosure.

Referring now to FIG. 7, a flow chart for a method 700 for providing wet proppant to a blender at a wellsite according to one or more aspects of the present disclosure is illustrated. In one or more embodiments, the method 700 may include transporting a bulk material container to a wellsite, engaging the bulk material container by an unloading device, emptying the bulk material container into a hopper, and metering the bulk material into a blender. At step 702, a bulk material container containing a bulk material may be transported to a location, such as a wellsite. In one or more embodiments, the bulk material may be a wet proppant. Further, in one or more embodiments, transporting the bulk material container to the wellsite may include engaging first engagement elements, second engagement elements, or third engagement elements of the bulk material container using a transportation device and lifting the bulk material container onto transportation vehicle. Furthermore, transporting the bulk material container to the wellsite may include coupling the bulk material container to the transportation vehicle or another bulk material container disposed on the transportation vehicle using second engagement elements of the bulk material container. Coupling the bulk material container to the transportation vehicle or another bulk material container may include locking a locking mechanism of the second engagement elements. Further, in one or more embodiments, the bulk material container may be filled after the bulk material container is lifted onto a transportation vehicle and after the bulk material container is coupled to the transportation vehicle. In other embodiments, the bulk material container may be filled with the bulk material before the bulk material container is coupled to the transportation vehicle or before the bulk material container is lifted onto the transportation vehicle. Additionally, in one or more embodiments, once the bulk material container is filled, a lid of the bulk material container may be closed. Furthermore, transporting the bulk material container to a wellsite may include removing the bulk material container from the transportation vehicle at the wellsite and storing the bulk material container at the wellsite.

Further, at step 704, the bulk material container may be engaged by an unloading device. In one or more embodiments, engaging the bulk material container by the unloading device may include transporting the bulk material container to the unloading device, and disposing the bulk material container adjacent to the unloading device. Furthermore, in one or more embodiments, transporting the bulk material container to the unloading device may include engaging first engagement elements, second engagement elements, or third engagement elements of the bulk material container using a transportation device, lifting the bulk material container, and moving the bulk material container. Additionally, in one or more embodiments, disposing the bulk material container adjacent to the unloading device may include engaging engagement elements of the unloading device with the first engagement elements, the second engagement elements, or the third engagement elements of the bulk material container using the transportation device. While in one or more embodiments, a transportation device delivers the bulk material container to an unloading device, in other embodiments, the transportation device is the unloading device having rotatable forks or prongs that may at least partially invert the bulk material container.

Furthermore, at step 706, the bulk material container may be emptied into a hopper. Emptying the bulk material container into the hopper may include lifting the bulk material container using the unloading device and rotating the bulk material container. In one or more embodiments, the unloading device may include engagement elements, a pivot arm, a first connector, a second connector, and a base. Further, in one or more embodiments, the bulk material container may be lifted from the ground and disposed above the hopper by rotating the pivot arm of the unloading device about the second connector, which is coupled between the pivot arm and the base. Once the bulk material container is disposed above the hopper, the bulk material container may be rotated at least 90 degrees relative to parallel with the ground by rotating the engagement elements of the unloading device about the first connector of the unloading device which is coupled between the pivot arm and the engagement elements of the unloading device. In one or more embodiments, the bulk material container may be rotated above the hopper until the bulk material container is fully inverted above the hopper. Furthermore, in one or more embodiments, emptying the bulk material container into the hopper may further include jarring the bulk material container. Jarring the bulk material container may be carried out by a vibration device coupled to the unloading device.

Additionally, at step 708, the bulk material may be metered into a blender. In one or more embodiments, metering the bulk material into a blender may include dispensing the bulk material from the hopper into a delivery device and moving the bulk material into the blender using the delivery device. Further, in one or more embodiments, dispensing the bulk material from the hopper into the delivery device may include at least partially opening a release mechanism of the hopper and/or vibrating the hopper. Furthermore, in one or more embodiments, moving the bulk material into the blender using the delivery device may include operating the delivery device. In one or more embodiments, where the delivery device is a conveyor belt system, operating the delivery device may include rotating a roller of the conveyor belt system to rotate a belt of the conveyor belt system. In other embodiments, where the delivery device is an auger system, operating the delivery device may include rotating a helical screw blade of the auger system. In further embodiments, where the delivery device is a gravity chute system, operating the delivery device may include at least partially opening a valve or gate coupled to an outlet of the gravity chute system. Additionally, in one or more embodiments, moving the bulk material into the blender using the delivery device may include measuring a rate at which the bulk material is dispensed into the blender from the delivery device, and controlling the rate at which the bulk material is dispensed into the blender from the delivery device.

According to one or more aspects of the present disclosure, the bulk material unloading system including the bulk material container described herein is an efficient and cost-effective system for unloading wet proppant from the bulk material container and providing it to a blender for the formation of fluids for use in wellbore operations. The bulk material container according to one or more aspects of the present disclosure limits the amount of bulk material left behind when the bulk material is wet and the bulk material container is emptied into a hopper. Further, the bulk material unloading system according to one or more aspects of the present disclosure limits the clumping of the bulk material, and thus, limits the inconsistent consistency of the bulk material being provided to the blender that clumping can cause.

An embodiment of the present disclosure is a bulk material unloading system. The system includes a bulk material container and an unloading device. The bulk material container contains a bulk material. Further, the unloading device is configured to engage the bulk material container, to lift the bulk material container above a hopper, and to at least partially invert the bulk material container.

In one or more embodiments described in the preceding paragraph, the bulk material container includes one or more engagement elements, the unloading device includes one or more engagement elements, and the one or more engagement elements of the unloading device are configured to engage the one or more engagement elements of the bulk material container. In one or more embodiments described in the preceding paragraph, the unloading device includes a pivot arm, one or more engagement elements, a first connector coupled between the pivot arm and the one or more engagement elements of the unloading device, and a second connector coupled to the pivot arm. In one or more embodiments described in the preceding paragraph, the pivot arm is configured to rotate about the second connector between a first position and a second position, where in the first position, the unloading device is configured to receive and engage with the bulk material container, and where in the second position, the bulk material container is disposed above a hopper. In one or more embodiments described in the preceding paragraph, the one or more engagement elements of the unloading device are configured to rotate about the first connector between a third position and a fourth position, wherein the fourth position is substantially perpendicular to the third position. In one or more embodiments described in the preceding paragraph, the unloading device further includes a base and a vibration device. Furthermore, the pivot arm is coupled to the base by way of the second connector. Additionally, the vibration device is coupled to one of the pivot arm, the one or more engagement elements of the unloading device, or the base, and the vibration device is configured to vibrate the bulk material container. In one or more embodiments described in the preceding paragraph, the unloading device further includes a receiving station and a sensor. The receiving station is disposed on a ground adjacent to one of the one or more engagement elements of the unloading device when the pivot arm is in the first position. Furthermore, the sensor is configured to measure a weight of the bulk material container and the bulk material disposed therein, and the sensor is coupled to the receiving station. In one or more embodiments described in the preceding paragraph, the unloading device includes one or more engagement elements, an engagement element connector, and a base. The one or more engagement elements are coupled to the base by way of the engagement element connector, and the one or more engagement elements are configured to rotate about the base by way of the engagement elements connector. In one or more embodiments described in the preceding paragraph, the bulk material unloading system further includes a hopper, a delivery device, and a blender. Further, the hopper is configured to receive the bulk material from the bulk material container, the hopper is configured to dispense the bulk material into the delivery device, and the delivery device is configured to move the bulk material into the blender. In one or more embodiments described in the preceding paragraph, the hopper includes a release mechanism, where the release mechanism is one of a valve or a gate. In one or more embodiments described in the preceding paragraph, the hopper includes an additive dispensing device, where the additive dispensing device is configured to dispense one or more additives into the bulk material. In one or more embodiments described in the preceding paragraph, the hopper includes one or more sensors, where the one or more sensors are configured to measure one or more parameters of the bulk material. In one or more embodiments described in the preceding paragraph, the hopper includes a vibration device, where the vibration device is configured to vibrate the hopper. In one or more embodiments described in the preceding paragraph, the delivery device is one of a conveyor belt, a gravity chute, or an auger. In one or more embodiments described in the preceding paragraph, the delivery device includes a bulk material rate measurement system configured to measure a rate at which the bulk material is dispensed by the delivery device to the blender, and a control system configured to control the rate at which the bulk material is dispensed by the delivery device to the blender. In one or more embodiments described in the preceding paragraph, the bulk material may be a wet proppant.

Another embodiment of the present disclosure is a method for unloading a bulk material container. The method includes engaging a bulk material container containing a bulk material with an unloading device, emptying the bulk material from the bulk material container, where emptying the bulk material container includes lifting the bulk material container using the unloading device, and rotating the bulk material container using the unloading device.

In one or more embodiments described in the preceding paragraph, engaging the bulk material container with the unloading device includes transporting the bulk material container to the unloading device and disposing the bulk material container adjacent to the unloading device. In one or more embodiments described in the preceding paragraph, transporting the bulk material container to the unloading device includes engaging one or more first engagement elements of the bulk material container, one or more second engagement elements of the bulk material container, or one or more third engagement elements of the bulk material container using a transportation device, lifting the bulk material container, and moving the bulk material container. Furthermore, disposing the bulk material container adjacent to the unloading device includes engaging one or more engagement elements of the unloading device with one of the one or more first engagement elements of the bulk material container, the one or more second engagement elements of the bulk material container, or the one or more third engagement elements of the bulk material container. In one or more embodiments described in the preceding paragraph, the unloading device includes a pivot arm, one or more engagement elements, a first connector coupled between the pivot arm and the one or more engagement elements of the unloading device, and a second connector coupled to the pivot arm. Further, lifting the bulk material container using the unloading device includes lifting the bulk material container above a hopper. Furthermore, rotating the bulk material container using the unloading device includes rotating the pivot arm of the unloading device about the second connector and rotating the one or more engagement elements of the unloading device about the first connector. Additionally, the bulk material container is rotated at least 90 degrees by the unloading device. In one or more embodiments described in the preceding paragraph, emptying the bulk material container into the hopper further includes jarring the bulk material container. In one or more embodiments described in the preceding paragraph, the method further includes metering the bulk material into a blender, where metering the bulk material into the blender includes dispensing the bulk material from the hopper into a delivery device and moving the bulk material into the blender using the delivery device. In one or more embodiments described in the preceding paragraph, metering the bulk material into a blender further includes measuring a rate at which the bulk material is dispensed into the blender from the delivery device and controlling the rate at which the bulk material is dispensed into the blender from the delivery device. In one or more embodiments described in the preceding paragraph, the bulk material is a wet proppant. In one or more embodiments described in the preceding paragraph, the method further includes transporting the bulk material container to a location, where transporting the bulk material container to the location includes engaging the bulk material container using a transportation device, lifting the bulk material container onto a transportation vehicle, coupling the bulk material container to the transportation vehicle, and locking a locking mechanism of the bulk material container.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A bulk material unloading system, comprising:
   a bulk material container containing a bulk material; and
   an unloading device;
   wherein:
   the bulk material container includes one or more engagement elements;
   the unloading device includes one or more engagement elements;
   the one or more engagement elements of the unloading device are configured to engage the one or more engagement elements of the bulk material container;
   the one or more engagement elements of the unloading device comprise a set of forks or prongs or a locking mechanism;
   the unloading device is configured to engage the bulk material container, to lift the bulk material container above a hopper, and to at least partially invert the bulk material container;
   the one or more engagement elements of the bulk material container comprise a first engagement element and a second engagement element, and wherein the first engagement element differs from the second engagement element; and
   the first engagement element is configured for engagement by a transportation device, and the second engagement element is configured for engagement by the unloading device.

2. The bulk material unloading system of claim 1, wherein the unloading device further comprises:
   a pivot arm;
   a first connector coupled between the pivot arm and the one or more engagement elements of the unloading device; and
   a second connector coupled to the pivot arm.

3. The bulk material unloading system of claim 2, wherein:
   the pivot arm is configured to rotate about the second connector between a first position and a second position;
   in the first position, the unloading device is configured to receive and engage with the bulk material container; and
   in the second position, the bulk material container is disposed above the hopper.

4. The bulk material unloading system of claim 2, wherein:
   the one or more engagement elements of the unloading device are configured to rotate about the first connector between a third position and a fourth position; and
   the fourth position is substantially perpendicular to the third position.

5. The bulk material unloading system of claim 2, wherein the unloading device further comprises:
   a base, wherein the pivot arm is coupled to the base by way of the second connector; and
   a vibration device, wherein the vibration device is coupled to one of the pivot arm, the one or more engagement elements of the unloading device, or the base, and wherein the vibration device is configured to vibrate the bulk material container.

6. The bulk material unloading system of claim 1, wherein:
   the unloading device comprises:
   an engagement element connector; and
   a base, wherein the one or more engagement elements are coupled to the base by way of the engagement element connector, and wherein the one or more engagement elements are configured to rotate about the base by way of the engagement elements connector.

7. The bulk material unloading system of claim 1, further comprising:
   a hopper;
   a delivery device; and
   a blender,
   wherein the hopper is configured to receive the bulk material from the bulk material container, wherein the hopper is configured to dispense the bulk material into the delivery device, and
wherein the delivery device is configured to move the bulk material into the blender.

8. The bulk material unloading system of claim 7, wherein the delivery device is one of a conveyor belt, a gravity chute, or an auger.

9. The bulk material unloading system of claim 1, wherein the bulk material is a wet proppant.

10. A method, comprising:
engaging a bulk material container containing a bulk material with an unloading device;
emptying the bulk material from the bulk material container, wherein emptying the bulk material container comprises:
lifting the bulk material container using the unloading device; and
rotating the bulk material container using the unloading device;
wherein:
rotating the bulk material container comprises at least partially inverting the bulk material container over a hopper;
the unloading device includes one or more engagement elements configured to engage one or more engagement elements of the bulk material container;
the one or more engagement elements of the unloading device comprise one or more forks or prongs or locking mechanism;
engaging the bulk material container with the unloading device comprises:
transporting the bulk material container to the unloading device; and
disposing the bulk material container adjacent to the unloading device;
transporting the bulk material container to the unloading device comprises:
engaging the one or more engagement elements of the bulk material container using a transportation device;
lifting the bulk material container; and
moving the bulk material container;
disposing the bulk material container adjacent to the unloading device comprises:
engaging the one or more engagement elements of the bulk material container using the one or more engagement elements of the unloading device; and
the one or more engagement elements of the bulk material container comprises a first engagement element and a second engagement element, wherein the first engagement element comprises one or more locking mechanism, and the second engagement element comprises one or more slot or bracket, wherein the transportation device engages one of the first and second engagement elements, and wherein the unloading device engages a different one of the first and second engagement elements.

11. The method of claim 10, wherein:
the unloading device comprises:
a pivot arm;
a first connector coupled between the pivot arm and the one or more engagement elements of the unloading device; and
a second connector coupled to the pivot arm;
lifting the bulk material container using the unloading device comprises:
lifting the bulk material container above the hopper; and
rotating the bulk material container using the unloading device comprises:
rotating the pivot arm of the unloading device about the second connector; and
rotating the one or more engagement elements of the unloading device about the first connector,
wherein the bulk material container is rotated at least 90 degrees by the unloading device.

12. The method of claim 10, wherein emptying the bulk material container into the hopper further comprises:
jarring the bulk material container.

13. The method of claim 10, further comprising:
metering the bulk material into a blender, wherein metering the bulk material into the blender comprises:
dispensing the bulk material from the hopper into a delivery device; and
moving the bulk material into the blender using the delivery device.

14. The method of claim 13, wherein metering the bulk material into the blender further comprises:
measuring a rate at which the bulk material is dispensed into the blender from the delivery device; and
controlling the rate at which the bulk material is dispensed into the blender from the delivery device.

15. The method of claim 10, wherein the bulk material is a wet proppant.

16. The method of claim 10, further comprising:
transporting the bulk material container to a location, wherein transporting the bulk material container to the location comprises:
engaging the bulk material container using a transportation device;
lifting the bulk material container onto a transportation vehicle;
coupling the bulk material container to the transportation vehicle; and
locking a locking mechanism of the bulk material container.

17. A method, comprising:
engaging a bulk material container containing a bulk material with an unloading device;
emptying the bulk material from the bulk material container, wherein emptying the bulk material container comprises:
lifting the bulk material container using the unloading device; and
rotating the bulk material container using the unloading device;
wherein:
rotating the bulk material container comprises at least partially inverting the bulk material container over a hopper;
the unloading device includes one or more engagement elements configured to engage one or more engagement elements of the bulk material container;
the one or more engagement elements of the unloading device comprise one or more forks or prongs or locking mechanism;
engaging the bulk material container with the unloading device comprises:
transporting the bulk material container to the unloading device; and
disposing the bulk material container adjacent to the unloading device;

transporting the bulk material container to the unloading device comprises:
engaging the one or more engagement elements of the bulk material container using a transportation device;
lifting the bulk material container; and
moving the bulk material container;
disposing the bulk material container adjacent to the unloading device comprises:
engaging the one or more engagement elements of the bulk material container using the one or more engagement elements of the unloading device; and
the transportation device and the unloading device both engage the same one or more engagement elements of the bulk material container.

18. The method of claim 17, wherein the one or more engagement elements of the bulk material container comprises one or more locking mechanism; and wherein engaging the one or more engagement elements of the bulk material container using the one or more engagement elements of the unloading device comprises engaging the one or more locking mechanism of the bulk container with the corresponding one or more locking mechanism of the unloading device.

19. The method of claim 17, wherein the one or more engagement elements of the bulk material container comprises one or more slot or bracket; and wherein engaging the one or more engagement elements of the bulk material container using the one or more engagement elements of the unloading device comprises engaging the one or more slot or bracket with the one or more forks or prongs.

20. The system of claim 1, wherein the one or more engagement elements of the unloading device comprise a set of forks or prongs, and the one or more engagement elements of the of the bulk material container comprise one or more slot or bracket configured to receive the forks or prongs.

21. The system of claim 1, wherein the one or more engagement elements of the unloading device comprise a locking mechanism, the one or more engagement element of the bulk material container comprises a corresponding locking mechanism, and the one or more locking mechanism of the unloading device is configured to engage the corresponding locking mechanism of the bulk material container.

22. The system of claim 21, wherein the locking mechanism of the unloading device comprises a male or female portion, and the locking mechanism of the bulk material container comprises a corresponding male or female portion configured for engagement.

23. The system of claim 1, wherein the first engagement element comprises one or more slot or bracket and the second engagement element comprises one or more locking mechanism.

24. The system of claim 1, wherein the first engagement element comprises one or more slot or bracket, the second engagement element comprises one or more slot or bracket, and the one or more slot or bracket of the first engagement element differs from the one or more slot or bracket of the second engagement element.

25. The system of claim 24, wherein the one or more slot or bracket of the first engagement element differs from the one or more slot or bracket of the second engagement element by location or spacing.

26. A bulk material unloading system, comprising:
a bulk material container containing a bulk material; and
an unloading device;
wherein:
the bulk material container includes one or more engagement elements;
the unloading device includes one or more engagement elements;
the one or more engagement elements of the unloading device are configured to engage the one or more engagement elements of the bulk material container;
the one or more engagement elements of the unloading device comprise a set of forks or prongs or a locking mechanism;
the unloading device is configured to engage the bulk material container, to lift the bulk material container above a hopper, and to at least partially invert the bulk material container;
the unloading device further comprises:
a pivot arm;
a first connector coupled between the pivot arm and the one or more engagement elements of the unloading device; and
a second connector coupled to the pivot arm;
the pivot arm is configured to rotate about the second connector between a first position and a second position;
in the first position, the unloading device is configured to receive and engage with the bulk material container;
in the second position, the bulk material container is disposed above the hopper;
the one or more engagement elements of the unloading device are configured to rotate about the first connector between a third position and a fourth position; and
the fourth position is substantially perpendicular to the third position.

27. The system of claim 21, wherein the locking mechanism comprises an ISO container lock or twist lock.

28. The system of claim 22, wherein the locking mechanism comprises an ISO container lock or twist lock.

29. The method of claim 10, wherein the one or more locking mechanism comprises an ISO container lock or twist lock.

30. The method of claim 18, wherein the one or more locking mechanism comprises an ISO container lock or twist lock.

31. The method of claim 30, wherein engaging the one or more locking mechanism of the bulk container with the corresponding one or more locking mechanism of the unloading device comprises engaging a male portion of the locking mechanism with a corresponding female portion of the locking mechanism.

* * * * *